(12) United States Patent
Stingel, Jr. et al.

(10) Patent No.: US 7,401,709 B2
(45) Date of Patent: Jul. 22, 2008

(54) CONTAINER STORAGE AND DISPENSING APPARATUS WITH ADJUSTABLE CONTAINER POSITION

(75) Inventors: Frederick J. Stingel, Jr., Asheville, NC (US); Jeffrey W. Stingel, Asheville, NC (US); Frederick J. Stingel, III, Asheville, NC (US)

(73) Assignee: Vertique, Inc., Arden, NC (US)

( * ) Notice: Subject to any disclaimer, the term of this patent is extended or adjusted under 35 U.S.C. 154(b) by 562 days.

(21) Appl. No.: 10/654,154

(22) Filed: Sep. 3, 2003

(65) Prior Publication Data

US 2005/0045574 A1 Mar. 3, 2005

(51) Int. Cl.
*B65G 1/08* (2006.01)
(52) U.S. Cl. .................. 221/75; 193/27; 198/347.1; 414/276
(58) Field of Classification Search ............ 414/331.01, 414/331.04, 331.15, 276; 193/27; 198/347.1; 221/75
See application file for complete search history.

(56) References Cited

U.S. PATENT DOCUMENTS

| | | | | |
|---|---|---|---|---|
| 3,262,584 A | * | 7/1966 | Hayford, Jr. et al. | 414/792 |
| 3,477,560 A | * | 11/1969 | Broser | 198/777 |
| 4,251,177 A | * | 2/1981 | Neuhaeusser et al. | 414/276 |
| 4,621,745 A | * | 11/1986 | Grace | 221/75 |
| 4,757,915 A | * | 7/1988 | Albright et al. | 221/75 |
| 5,636,966 A | | 6/1997 | Lyon et al. | |
| 5,733,098 A | | 3/1998 | Lyon et al. | |
| 5,903,464 A | * | 5/1999 | Stingel et al. | 700/215 |
| 5,934,864 A | | 8/1999 | Lyon et al. | |
| 5,996,316 A | | 12/1999 | Kirschner | |
| 7,007,791 B2 | * | 3/2006 | Stingel et al. | 198/368 |
| 2001/0025765 A1 | * | 10/2001 | Ikegami | 198/347.1 |
| 2002/0106270 A1 | * | 8/2002 | Muilwyk | 414/276 |
| 2003/0149644 A1 | | 8/2003 | Stingel et al. | |

OTHER PUBLICATIONS

Layer Picking, Universal layer picker for mixed pallets brochure, Univeyor, Leicester, U.K.
SI ITEMatic Systems brochure, SI Handling Systems, Inc., Easton, Pennsylvania.

* cited by examiner

*Primary Examiner*—James Keenan
(74) *Attorney, Agent, or Firm*—Akerman Senterfitt; J. Rodman Steele, Jr.; Greogry A. Nelson

(57) ABSTRACT

An adjustable positioning apparatus for positioning containers on a shelf tray assembly of a vertically accumulating storage and retrieval apparatus has a container abutting portion and engagement structure for securing the container abutting portion on a portion of the shelf tray assembly so as to position the container on the shelf tray. A vertically accumulating storage and retrieval apparatus having adjustable container positioning structure is also disclosed.

3 Claims, 4 Drawing Sheets

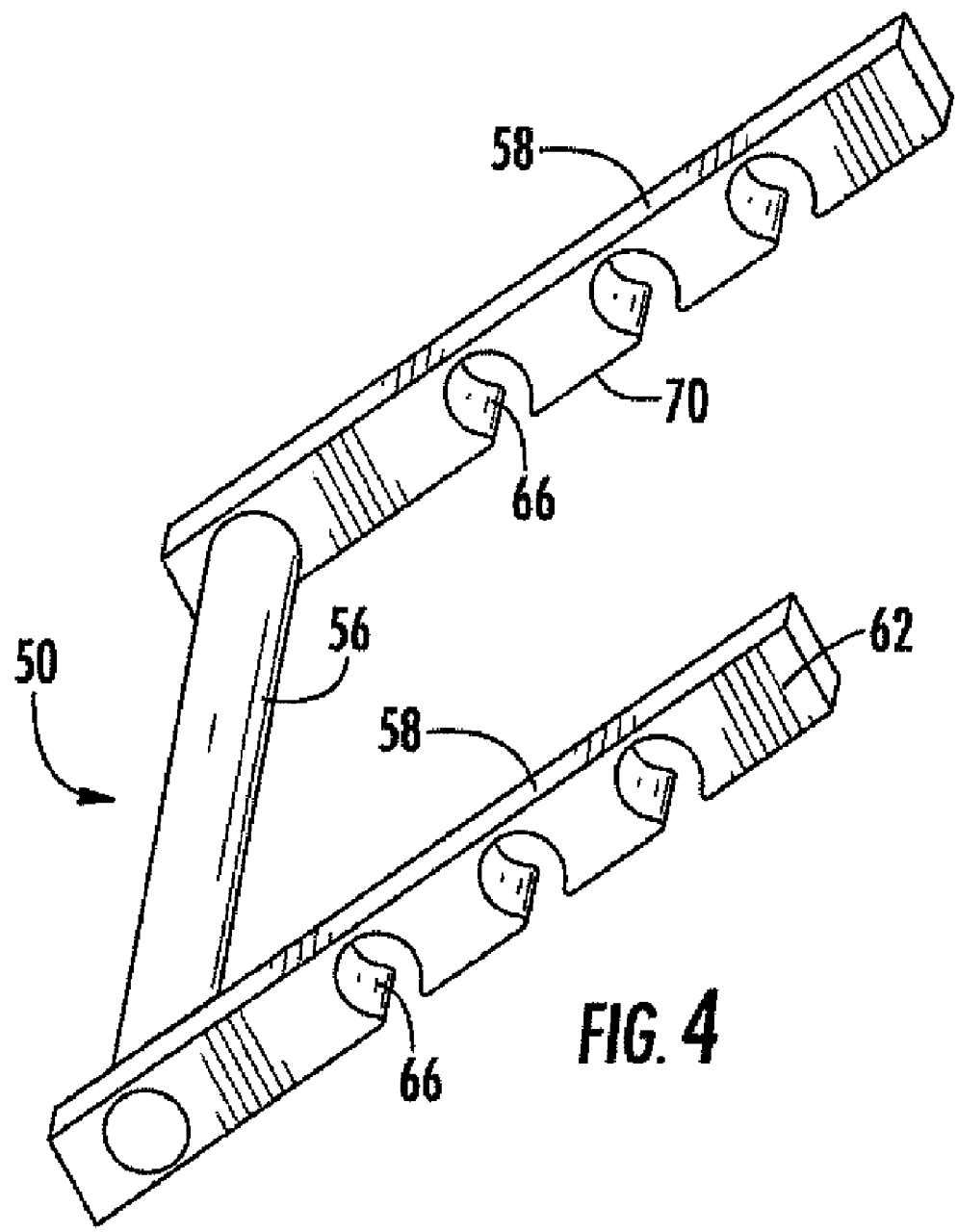

CONTAINER STORAGE AND DISPENSING APPARATUS WITH ADJUSTABLE CONTAINER POSITION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates to automated storage and dispensing systems for containers, articles, and the like. More particularly, the invention relates to vertically accumulating storage and retrieval apparatus.

BACKGROUND OF THE INVENTION

Systems for automating the storage and distribution of containerized goods in warehousing and manufacturing facilities have bee developed to reduce the expense and errors associated with manual storage and distribution. Automated storage and distribution systems, such as that described in Grace, U.S. Pat. No. 4,621,745, can improve warehouse and manufacturing operation efficiency and inventory management. U.S. Pat. No. 4,621,745 discloses a container storage and dispensing assembly for use in an automated storage and distribution systems. The assembly includes two opposing stacks of vertically staggered shelf assemblies. The shelf assemblies receive containers at the top of the stacks and distribute the containers in zigzag fashion downward through the stacks to a dispensing location at the bottom of the stacks. Each shelf assembly is mounted relative to a support structure to pivot between an upwardly tilted receiving position, a substantially horizontal storage position, and a downwardly tilted discharge position. In operation, a shelf assembly in the upwardly tilted receiving position receives a container from a next higher shelf assembly that is in the downwardly tilted discharge position. The receiving shelf assembly pivots downwardly under the weight of the container and locks in the horizontal storage position if the next lower shelf assembly is not in the receiving position.

The next lower shelf assembly assumes the receiving position when it is empty. The upper shelf assembly is unlocked from the storage position by the upward movement of the next lower shelf assembly, and is thereby permitted to pivot downwardly to the discharge position to transfer the container to the next lower shelf assembly. In this manner, the container is moved downwardly through the stacks in sequential fashion until the lower-most shelf assemblies are filled with containers, and advance sequentially as containers are dispensed from the bottom of the stacks.

Grace, Sr., U.S. Pat. No. 5,111,963, discloses a storage and dispensing apparatus for articles, containers, and the like, in which vertically spaced shelf assemblies pivot between receiving and discharge positions. Biasing structure is provided to urge the shelf assemblies to the receiving position. A transfer stop is connected to the shelf assembly and has a lock position retaining the shelf in the receiving position when a shelf of a next lower shelf assembly is not prepared to receive a container, and a release position allowing the shelf to move to the discharge position under weight of a container disposed on the shelf when the shelf of the next lower shelf assembly is prepared to receive a container. A transfer control is operatively connected between the transfer stop and the next lower shelf assembly for transitioning the transfer stop to the release position when the next lower shelf is prepared to receive a container.

Stingel, Jr. et al., U.S. Pat. No. 5,236,104, discloses a multiple pressure container storage and retrieval apparatus with opposing stacks of vertically staggered shelf assemblies. Fluid operated structure is provided to raise the shelf between at least a downwardly tilted discharge position and an upwardly tilted receiving position. A higher pressure fluid source and lower pressure fluid source are provided. Container indicator switching structure connects the raising structure to the higher pressure fluid source if a container is not present on the shelf, and to the lower pressure source if a container is present on the shelf. Transfer control structure is operatively connected between the shelf and the next lower shelf, and is adapted to prevent the lowering of the shelf to the discharge position unless the next lower shelf is in the receiving position.

Stingel, Jr. et al., U.S. Pat. No. 5,285,928, discloses a fluid operated container storage and dispensing system with stacks of opposing, vertically staggered shelf assemblies. A fluid operated system maintains each shelf in an upwardly tilted receiving position until a container is received and prevents the lowering of the shelf to the discharge position until the next lower shelf is prepared to receive a container.

Stingel, Jr., U.S. Pat. No. 5,779,094, discloses an article reception system for storage and dispensing apparatus in which there are two opposing vertical stacks of shelf assemblies. A pivotally mounted cross-bar extends transversely across each shelf and is moveable between an article receiving position and an article arresting position. A respective damper is provided for arresting motion of each cross-bar when engaged by a conveyed article and moved from the article receiving position to the article arrested position. A bias urges each cross-bar from the article arrested position to the article receiving position. An optical sensor on each shelf can be provided for detecting an article's presence and supplying a control signal to the independently pivoting shelves in a coordinated manner.

Stingel, Jr. et al., U.S. Pat. No. 5,903,464, discloses a conveying system and method for mixing stacked articles in which a first conveying path originates at a first working station and terminates at a second working station. A second conveying path originates at the second working station. The first working station selectively moves homogeneous layers of articles from respective stacks to the first conveying path. The second working station receives the articles from the first conveying path and distributes the articles into selected ones of a plurality of vertical conveying and storage paths. The articles are supplied to the second conveying path from the vertical conveying and storage paths in a pre-determined sequence. The pre-determined sequence is established by defining control sequences for the moving, distributing, and supplying performed in the work stations. The articles conveyed on the second conveying path can be arranged into groups relating to the pre-determined sequence.

Vertically accumulating storage and dispensing apparatus having opposing assemblies of staggered, vertically spaced, shelf assemblies require biasing or some motive force to raise the shelf assembly to the article receiving position. Also, some biasing or motive force should be provided to dampen the motion of the shelf assembly from the receiving position to the discharge position under the weight of the container. The amount of bias or motive force will be dependent on the weight and position of the container on the shelf assembly. In systems where a variety of different containers, having different sizes and weights, must be handled by the storage and dispensing system, different biasing or motive forces are required depending upon the article or container that is being handled by a particular tower. This can require many different bias or motive force structures to handle the different containers or articles. This increases the complexity of the system, and also does not allow for rapid reconfiguration of the system when it is desired that a particular tower handle containers or articles having different size and weight characteristics than were handled by the tower previously.

SUMMARY OF THE INVENTION

An apparatus is provided for positioning a container on a shelf tray of a vertically accumulating storage and retrieval apparatus. The apparatus comprises a container abutting portion. Engagement structure is provided for securing the container abutting portion over a portion of the shelf so as to stop and position the container on the shelf tray.

The engagement structure can be adjustable. The position of the container abutting portion is thereby also adjustable, such that containers having different sizes and weights can be positioned differently on the shelf tray.

The engagement structure can comprise elongated engagement members. The engagement members are connected to the container abutting portion. The elongated engagement members can have a plurality of spaced-apart engagement positions for engaging a portion of the shelf tray. The engagement positions can comprise grooves for receiving a portion of the shelf tray assembly. The grooves can be dimensioned to receive a cross-bar of a shelf tray assembly. The container abutting portion can be any suitable structure. In one embodiment, the container abutting structure is cylindrical.

A storage and dispensing apparatus for containers is provided. The apparatus comprises a first plurality of substantially vertically spaced shelf assemblies supported by a support structure. A second plurality of substantially vertically spaced shelf assemblies is supported by a support structure.

Each of the shelf assemblies of the storage and dispensing apparatus comprise a shelf tray for receiving, storing, and discharging containers. The shelf trays of the first plurality of shelf assemblies are substantially staggered vertically relative to the trays of the second plurality of shelf assemblies. Free ends of each plurality of shelf assemblies face the free ends of the other plurality of shelf assemblies. Each tray is mounted to its respective vertical support for pivotal movement between an upwardly tilted receiving position and a downwardly tilted discharge position.

Biasing structure is provided to dampen the descent of the tray under the weight of a container, and to raise the tray to the receiving position when it is empty. The biasing structure can be any suitable structure for applying a force to the tray such as a gas cylinder, a spring, a pneumatic device, an electromotive device such as a solenoid, or other suitable structure.

A transfer stop is operatively connected to the tray and has a lock position retaining the tray in the receiving position when a tray of a next lower shelf assembly is not prepared to receive a container and a release position allowing the tray to move to the discharge position under the weight of a container disposed on the shelf when the tray of the next lower shelf assembly is prepared to receive a container. A transfer control is operatively connected between the transfer stop and the next lower shelf assembly for transitioning the transfer stop to the release position when the next lower shelf is prepared to receive a container.

Adjustable container positioning structure is provided and attached to the shelf tray for positioning the articles, containers, and the like on the tray at a plurality of different positions. In this manner, containers having different sizes and weights can be positioned differently on the tray, such that the force that must be applied by the biasing structure need not change, or is within a range such that it can be adjusted without changing the device itself

BRIEF DESCRIPTION OF THE DRAWINGS

There is shown in the drawings embodiments which are presently preferred, it being understood, however, that the invention can be embodied in other forms without departing from the spirit or essential attributes thereof.

FIG. 4 is a perspective view of a container positioning apparatus according to the invention.

DETAILED DESCRIPTION OF THE INVENTION

This invention provides apparatus and method for positioning a container, article, or the like, on a vertically accumulating storage and retrieval apparatus. It will be appreciated that many different types and sizes of containers, articles, and the like, can be utilized with the invention. All such types of containers, articles, and the like, will hereinafter be collectively referred to as "container," without limitation as to the type, size, or nature of that which is being stored and retrieved. Further, the operation of a vertically accumulating storage and retrieval apparatus is known in the art, for example, in Grace, U.S. Pat. No. 4,621,745; Grace, U.S. Pat. No. 5,111,563; Stingel, Jr. et al., U.S. Pat. No. 5,236,104; Stingel, Jr. et al., U.S. Pat. No. 5,285,928; Stingel, Jr., U.S. Pat. No. 5,779,094; and Stingel, Jr. et al., U.S. Pat. No. 5,903,464. The disclosures of these patents are fully incorporated herein by reference.

Figure 1:
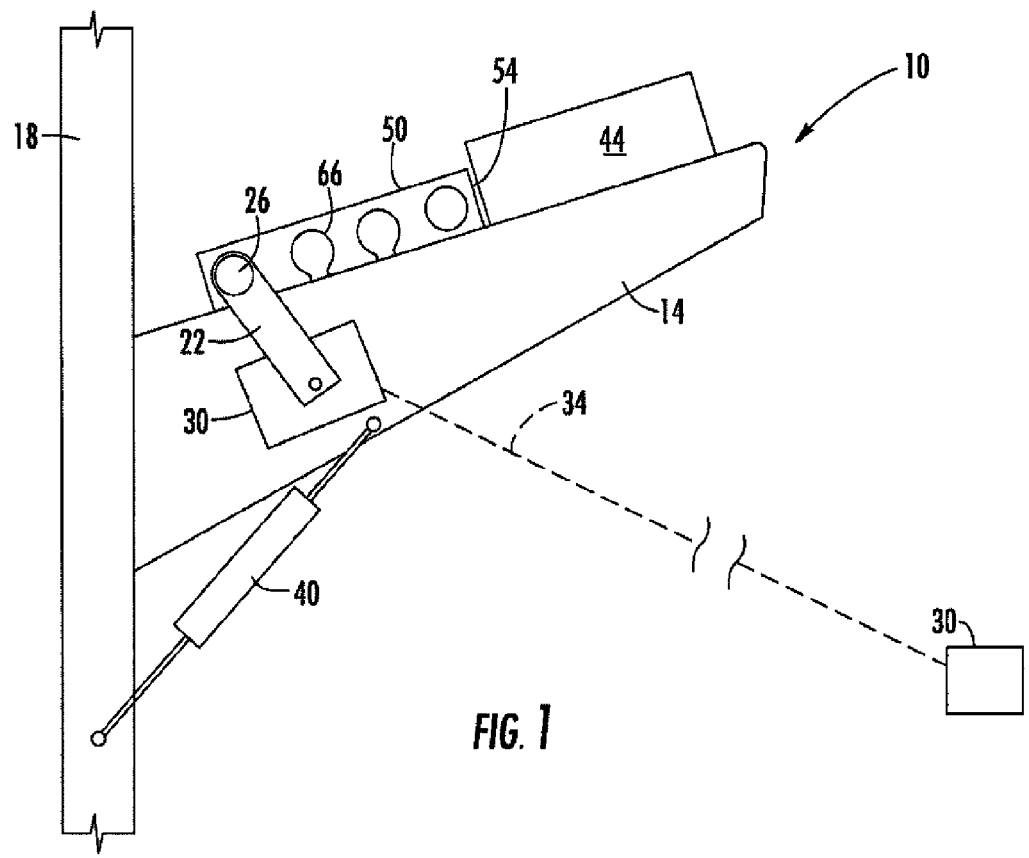
FIG. 1 is a side elevation of a shelf tray assembly having container positioning apparatus according to the invention, in a first position.
Figure 2:
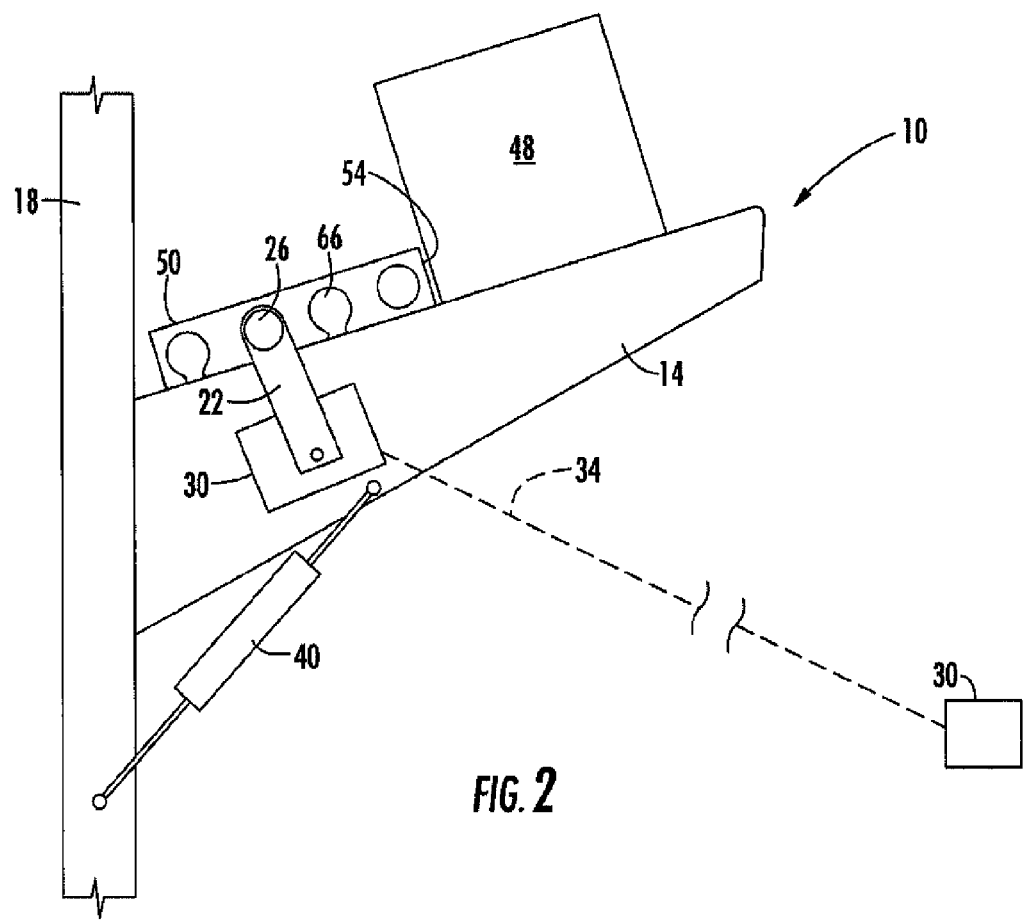
FIG. 2 is a side elevation of a shelf tray assembly having container positioning apparatus according to the invention, in a second position.
Figure 3:
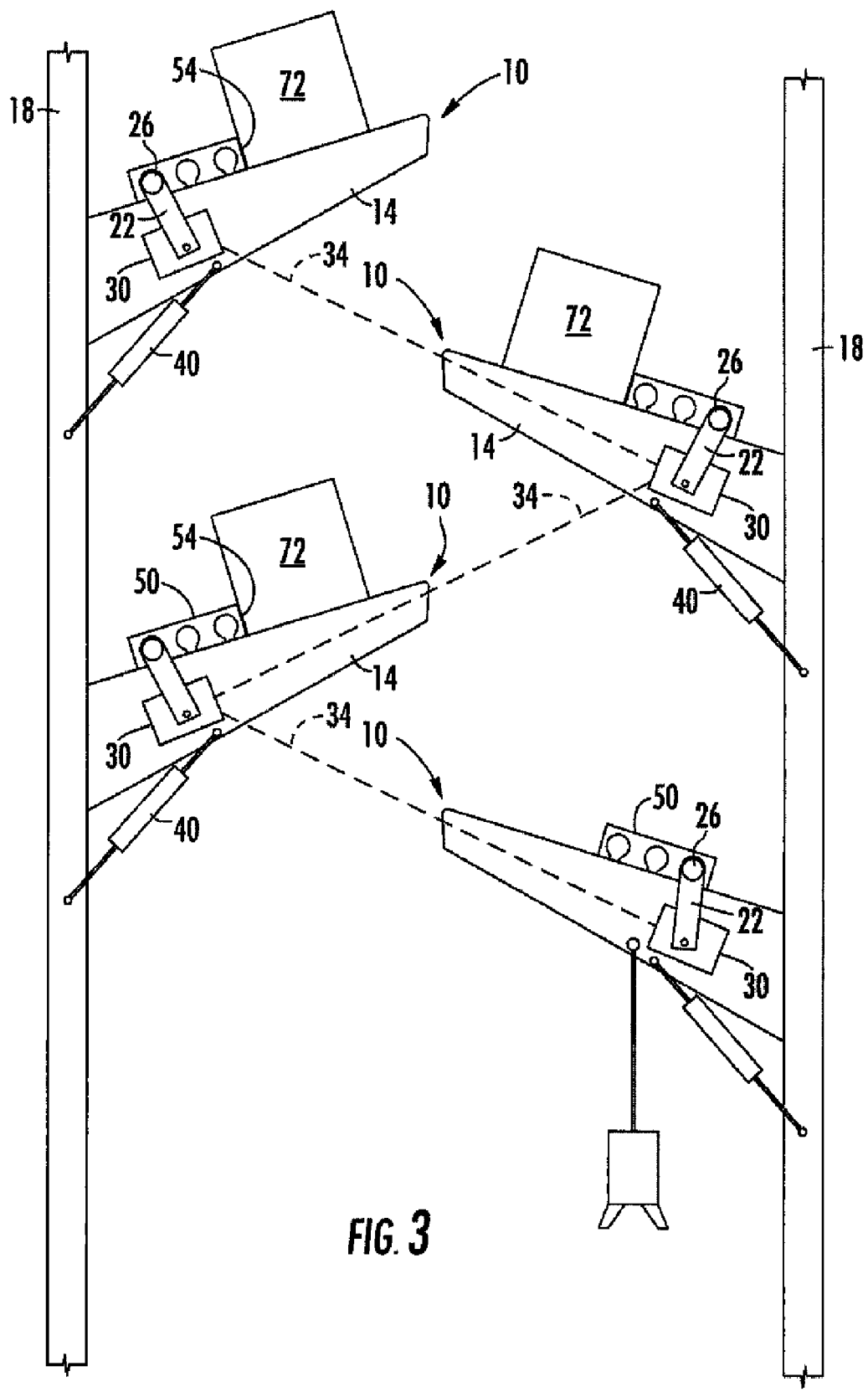
FIG. 3 is a side elevation of a storage and dispensing apparatus for containers according to the invention.

There is shown in FIGS. 1-3 a vertically accumulating storage and retrieval apparatus having a series of shelf tray assemblies 10 with shelf trays 14 pivotally mounted on supports 18. A container arresting assembly 22 is pivotally mounted to the tray 14 and has a cross-bar 26 extending laterally across the tray with which to contact containers 44.

The container arresting assembly 22 and cross-bar 26 indicate the presence of a container 44 and/or serve to dampen the motion of the container onto the tray 14. Whether the container arresting assembly 22 or some other device is used to indicate the presence of the container, this signal is provided to a transfer control 30. The transfer control 30 can be any of a number of devices which are mechanically or electrically connected so as to permit the downward pivoting of the tray 14 upon the presence of the container 44, and upward tilting of the tray to the receiving position when the tray 14 is empty. It will be appreciated that the transfer control 30 is shown schematically, and can be a single device or multiple devices which yield the desired functions. A transfer control linkage 34 can be any suitable control signal, including mechanical, electrical, and wireless. The transfer control linkage 34 is utilized to convey messages from a transfer control 30 of the next lower tray, or other suitable structure, to indicate the presence of a container at the next lower tray. As is known in the art, if the next lower tray is empty, it is in the receiving position and a signal is sent through the transfer control linkage 34 to the upper tray to release the tray and permit downward pivoting of the tray such that the container 44 is vertically transferred from the upper tray to the next lower tray. The procedure continues downward through the tower until all lower trays are occupied. Biasing structure 40 is provided to lift the tray 14 after it has discharged the container 44. The biasing structure 40 can also dampen the descent of the tray 14 under the weight of the container 44. The biasing structure 40 can be any suitable structure, such as a gas cylinder, a spring, a pneumatic device, an electromotive device such as a solenoid, or any other structure capable of lifting the tray 14 and dampening the descent of the tray 14.

The amount of force that must be applied by the biasing structure 40 varies with the size and weight of the container 44. The container 44 shown in FIG. 1, for example, is smaller and lighter than the container 48 shown in FIG. 2. Efficient operation of the trays 14 requires that the biasing structure 40 permit the descent of the tray 14 under the weight of the container at the appropriate speed. As the container weight changes, the amount of biasing must also change. No matter whether the biasing structure 40 is a gas cylinder, pneumatic, spring, or electromechanical, the sizing, type, and other characteristics of the biasing 40 may need to be adjusted. As vertically accumulating storage and retrieval apparatus are used in installations where dozens or even hundreds of towers are utilized with dozens or hundreds of different containers, the problem of properly biasing the trays with appropriate biasing structure 40 providing the appropriate bias force can become significant. Also, it is sometimes necessary to change the container type that is placed into a given tower. In such instances, it is difficult and time-consuming to change the biasing structure 40 to better suit the container.

The invention provides adjustable positioning structure 50 to adjust the position of the container 44 or 48 on the trays 14. The structure 50 can be any suitable structure. The structure 50 can be affixed to the support 18, the tray 14, or some other part of the shelf assembly 10, and can be detachable or integral. The adjustable positioning structure 50 provides an adjustably positionable container abutting surface 54 which stops the container at a desired position on the tray 14. Any suitable structure is possible. The position of the container abutting surface 54 on the shelf tray assembly 10 can be changed by interchanging one positioning structure 50 with a differently sized positioning structure 50. It is preferable, however, to provide the positioning structure 50 with adjustable engagement structure such that a single positioning structure 50 can be used to position the container abutting surface 54 in a plurality of different positions. Any suitable adjustable engagement structure can be used, such as structure that adjusts the position of the container abutting surface 54 relative to other portions of the positioning structure 50.

It is most preferable that the adjustable positioning structure 50 be detachable. One such structure is shown in FIG. 4. The positioning structure 50 includes a suitable container abutting portion such as cross-bar 56 and structure for detachably engaging the positioning structure 50 to a portion of the tray assembly 10. The structure for engaging a portion of the tray assembly 10 can be any suitable structure. In the embodiment shown in FIG. 4, the engagement structure includes elongated side members 58, 62. The side members 58, 62 have structure for engaging a portion of the tray assembly 10. This structure can be a plurality of receiving grooves 66 which engage suitable structure on the tray assembly 10, such as the cross-bar 26 of the arresting assembly 22. It is possible to provide adjustable positioning structure which engages other portions of the shelf tray assembly 10. In the embodiment shown, the adjustable positioning structure 50 engages the cross-bar 26 of the tray arresting assembly 22 in the grooves 66. Bottom edges 70 can rest on the shelf tray assembly 10. In this manner, it is easily detached and repositioned according to the size and weight of the container being stored in the tower.

As shown in FIG. 1, the adjustable positioning structure 50 is positioned over the cross-bar 26 and engaged by the receiving grooves 66. The container 44, being lighter, is positioned closer to the free end of the tray 14. A heavier container 48 is shown in FIG. 2. The adjustable positioning structure 50 is arranged in a different receiving grooves 66 such that the heavier container 48 is positioned farther from the free end of the tray 14. It will be appreciated that the moment created by the heavier container 48 decreases as the container moves closer to the pivot point of the tray 14. The amount of biasing that must be provided by the biasing structure 40 thereby also decreases. In this manner, the adjustable positioning structure 50 can be used to position containers on the tray such that the biasing that must be provided by the biasing structure 40 does not change radically, and the biasing structure 40 does not need to be changed. It is possible that the biasing structure 40 does not need to be adjusted in any way. In some instances, minor adjustments to cylinder pressure, spring tension, or the like, need only be made to the biasing structure 40.

The adjustable positioning structure 50 can be made of any suitable material. Suitable materials include stainless steel, plastics, and other durable and corrosion resistant materials.

This invention can be embodied in other forms without departing from the spirit or essential attributes thereof and, accordingly, reference should be had to the following claims rather than the foregoing specification as indicating the scope of the invention.

We claim:

1. An attachable device for positioning a container on an existing shelf tray of an existing shelf tray assembly of a vertically accumulating storage and retrieval apparatus, said existing shelf tray assembly having front and rear portions and a container arresting assembly for contacting a container at a first contact location, said device comprising:

a container abutting portion having opposing ends; and elongated adjustable engagement structure, wherein said engagement structure comprises elongated engagement members connected to said opposing ends of said container abutting portion, said elongated engagement members having a plurality of spaced apart engagement positions for detachably engaging said device to said container arresting assembly of said existing shelf tray assembly in a plurality of different possible locations so as to position said container abutting portion of said device on said existing shelf tray and thereby change said first contact location on said existing shelf tray to one of a plurality of different possible contact locations, without modifying said existing shelf tray assembly.

2. The device of claim 1, wherein said engagement positions comprise grooves for receiving a portion of said shelf tray assembly.

3. The device of claim 2, wherein said grooves are dimensioned to receive a cross-bar of said container arresting assembly.

* * * * *